Oct. 29, 1929.  C. J. NORDSTROM  1,733,818
INSECT TRAP
Filed Nov. 1, 1927
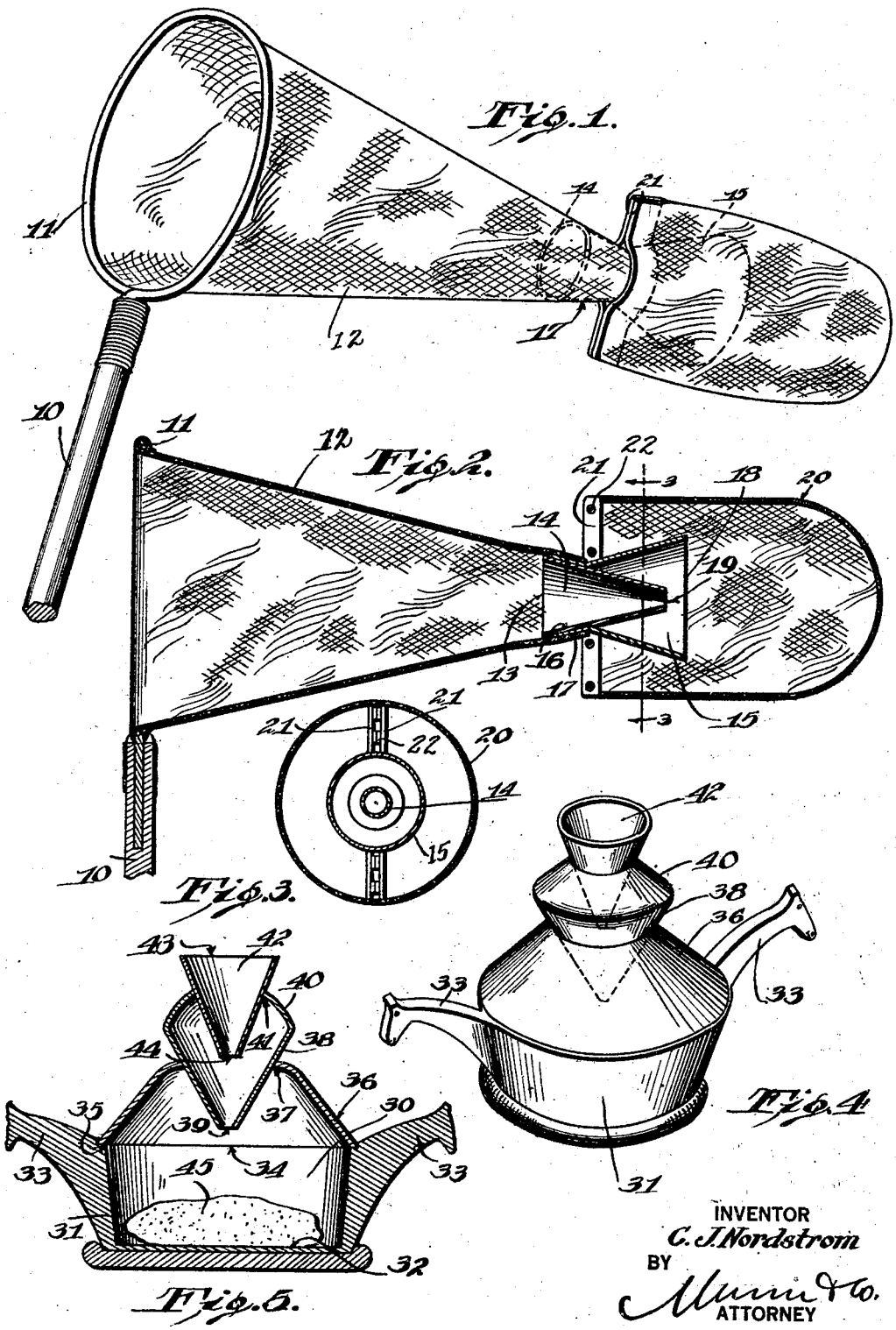

Patented Oct. 29, 1929

1,733,818

UNITED STATES PATENT OFFICE

CARL JONAS NORDSTROM, OF LAKE GEORGE, NEW YORK

INSECT TRAP

Application filed November 1, 1927. Serial No. 230,358.

This invention relates to an insect trap or catching device.

An object of the invention is the provision of a device provided with a passage through which an insect may travel, but having restricted portions which will prevent the escape of an insect.

Another object of the invention is the provision of an insect trap or catching device which has conically shaped members open at its opposite ends which will aid in guiding an insect into a chamber, but which will not only prevent the escape of the insect from the chamber but will tend to divert the insect away from the restricted passage through which said insect has previously entered.

A further object of the invention is the provision of a trap or catching device which has fabricated sections connected together, said sections being in communication with each other by means of a path which will not only permit but will guide the insects to one of the sections forming a sealed chamber while preventing the escape of the insects from said chamber.

This invention will be best understood from a consideration of the following detailed description in connection with the accompanying drawings; nevertheless it is to be understood that this invention is not confined to the disclosure being susceptible of such changes and modifications as shall define no material departure from the salient features of the invention as expressed in the appended claims.

In the drawings:—

Figure 1 is a view in perspective of an insect catching device constructed according to the principles of my invention, Figure 2 is a vertical longitudinal section of the insect catching device, Figure 3 is a transverse vertical section taken along the line 3—3 of Fig. 2, Figure 4 is a view in perspective of a modified form of the trap, Figure 5 is a vertical section of the form shown in Fig. 4.

Referring more particularly to the drawings 10 designates a handle to which is secured a wire loop 11 which is preferably circular in shape. The frusto-conically shaped fabricated casing 12 has its enlarged open end secured to the loop 11, the other open end being secured in any approved manner to the outer enlarged open end 13 of a frusto-conically shaped member 14 formed of any suitable stiff material such as paper or metal.

The frusto-conically shaped casing 12 receives the member 14 through the restricted opening 16 and has a portion 17 secured to the outer wall of the member 14 and adjacent the open end 13. The end of the member 15 as shown at 18, is open adjacent the restricted open end 19 of the member 14 and is located substantially within a fabricated sack or casing 20.

The sack 20 at its open end is provided with strips 21 of relatively stiff material which are secured together and embrace that portion of the frusto-conically shaped member 15 where it is connected to the member 14 and at the inner terminus of the fabricated casing 12. The strips 21 as illustrated in Figures 2 and 3 are provided with complementary members 22 of a well known snap fastener so that a sack 20 may be readily secured to or removed from the member 15.

In operation the device shown in Figs. 1 to 3 inclusive is grasped by the handle 10 and is adapted to be moved rapidly through the air in order to aline the open end or loop 11 of the sack 12 with a plurality of insects which may be in motion or may be resting upon some object. The insects then find their way through the frusto-conically shaped member and through the restricted opening 19 at the inner end of said member, thereby entering the chamber formed in the fabricated sack or casing 20 where they are trapped against escape. The member 15 being located centrally of the sack 20 will tend to direct generally the insects away from the opening 19 by reason of the fact that this member extends outwardly from the closed end 21 and in embracing and protecting relation with the inner end of the frusto-conically shaped member 14. In case insects reach the interior of the member 15 they will be further directed away from the open end 19 of the member 14 by reason of the gradually decreasing space between the members 14 and 15 so that the insects will tend to be directed rearwardly on the member 15 rather than on the inclined wall of the inner portion of the member 14. Furthermore the opening 19 being only large enough to admit a fly, and situated at the inner end of the frusto-conically shaped member at the restricted portion, will tend to prevent the escape of insects through said opening while at the same time providing a directional path for insects which are in the sack 12 to the sack 20. The opening 19 is relatively small in order to minimize the escape from the chamber 20. The swinging motion of the trap will also cause the flies to gravitate toward the bottom of the chamber and when not in use the trap can be folded over at the portion 14, or the bag 20 may be detached and the flies destroyed.

Figs. 4 and 5 disclose a modified form of the invention but preserve the tortuous path which will tend to direct insects into the closed chamber, but which will prevent the escape of said insects. A chamber 30 is formed in a container 31 having a base member 32 and handles 33. The upper end of the chamber is open, as shown at 34, and a shoulder 35 is provided at the upper end of the container to receive the lower open end of a cover 36.

The cover is provided with an opening 37 which receives a frusto-conically shaped member 38 having the inner restricted end open, as shown at 39, and having a curved top or closure 40. The member 38 is supported in the opening 37 on the cover 36 and has its restricted open end 39 located adjacent the outer open end 34 of the container 31. The cover 40 has an opening 41 which receives the frusto-conically shaped member 42. The outer projecting end 43 of the member 42 is open and is of greater area than the inner restricted open end 44 of the member 42. The members 42 and 38 thereby provide a tortuous path to the chamber 30.

Any kind of sweetened material 45 is placed on the bottom 32 of the container 31 and is adapted to also contain some poisonous material, which when eaten by the insects entering the chamber will cause destruction of the insects.

The members 42, 38 and 36 are each removable from each other and also removable from the container 31. The member 38 may be dispensed with and a frusto-conically shaped member 42 may be seated directly in the opening 37.

The vapors emanating from the sweetened ingredients 45 in the container 31 will pass through the openings 39, 44 and 43 to the atmosphere to attract insects which will enter the member 42, pass through the restricted opening 44 and then through the restricted opening 39 to the chamber 30. The members 42 and 38 thus provide a tortuous path which will permit the insects to enter the chamber 30 very readily but which will prevent the escape of the insects since the inclined sides of the members 38 and 42 will tend at all times to direct the insects away from the restricted openings 39 and 44 respectively.

I claim:—

A fly trap comprising a fabricated casing having its opposite ends open, one end of the casing being restricted in cross section, a frusto-conically shaped member mounted in the restricted end of the casing, a second conically shaped member having its opposite ends open with its restricted end secured to the restricted end of the first-mentioned conically-shaped member, a fabricated sack with an open end and having stiffening strips secured to the sack adjacent the open end, separable fasteners connected with the strips, the second-mentioned frusto-conically shaped member being inserted in the open end so that when the separable fasteners are moved into operative relation for closing a portion of the open end of the sack, the remaining portion of the open end and likewise the strips will embrace the two frusto-conically shaped members at points where the members are connected together for removably securing the sack to said members.

Signed at New York, in the county of New York and State of New York, this 31st day of October, 1927.

CARL JONAS NORDSTROM.